(12) United States Patent
Kiilerich Pratas et al.

(10) Patent No.: US 12,273,208 B2
(45) Date of Patent: Apr. 8, 2025

(54) HARQ FEEDBACK TECHNIQUE FOR COMMUNICATION SYSTEMS

(71) Applicant: Nokia Technologies Oy, Espoo (FI)

(72) Inventors: Nuno Manuel Kiilerich Pratas, Gistrup (DK); Jeroen Wigard, Klarup (DK); Benny Vejlgaard, Gistrup (DK); Carlos Santiago Morejon Garcia, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 610 days.

(21) Appl. No.: 17/429,980

(22) PCT Filed: Feb. 14, 2019

(86) PCT No.: PCT/EP2019/053658
§ 371 (c)(1),
(2) Date: Aug. 11, 2021

(87) PCT Pub. No.: WO2020/164709
PCT Pub. Date: Aug. 20, 2020

(65) Prior Publication Data
US 2022/0140957 A1    May 5, 2022

(51) Int. Cl.
*H04L 1/18*   (2023.01)
*H04L 1/1867*   (2023.01)
*H04L 5/00*   (2006.01)

(52) U.S. Cl.
CPC .......... *H04L 1/1893* (2013.01); *H04L 5/0044* (2013.01); *H04L 5/0055* (2013.01)

(58) Field of Classification Search
CPC ....... H04W 72/121; H04W 4/40; H04W 4/46; H04L 5/0055; H04L 1/1812; H04L 1/1858; G06F 12/0864
See application file for complete search history.

(56) References Cited

U.S. PATENT DOCUMENTS

| 2009/0245198 A1 | 10/2009 | Tiirola et al. |
| 2010/0260138 A1 | 10/2010 | Liu et al. ..................... 370/330 |
| 2012/0263121 A1 | 10/2012 | Chen et al. |

(Continued)

FOREIGN PATENT DOCUMENTS

| CN | 103141049 A | 6/2013 |
| CN | 104040931 A | 9/2014 |

(Continued)

OTHER PUBLICATIONS

Liu, Gao hua et al., "Transmission technique of hybrid automatic repeat request bas ed on frequency resources re-election in long term evolution", Journal of Computer Application, ISSN 1001-9081, Jul. 1, 2012, 4 pages.

*Primary Examiner* — Yee F Lam
(74) *Attorney, Agent, or Firm* — McCarter & English LLP

(57) ABSTRACT

A device receiving a transmission is configured to provide its feedback in a unique resource pattern within a set of resources (a resource pool). The resource pattern used by the device overlaps partially with one or more resource patterns used for feedback transmissions by other devices in the group. The transmitting device is able to identify the device by identifying an activation pattern matching the unique resource pattern of the device in the overall feedback that it receives from the devices of the group.

16 Claims, 10 Drawing Sheets

(56) References Cited

U.S. PATENT DOCUMENTS

| | | | |
|---|---|---|---|
| 2014/0036810 A1* | 2/2014 | Harrison | H04L 5/0053 370/329 |
| 2016/0056940 A1* | 2/2016 | Chae | H04L 5/0055 370/312 |
| 2017/0311182 A1 | 10/2017 | Tenny et al. | |
| 2019/0007974 A1* | 1/2019 | Nguyen | H04L 67/12 |
| 2019/0052436 A1* | 2/2019 | Desai | H04W 72/0446 |
| 2019/0174530 A1* | 6/2019 | Kim | H04W 72/12 |
| 2019/0182639 A1* | 6/2019 | Basu Mallick | H04W 72/23 |
| 2019/0306835 A1* | 10/2019 | Hoang | H04W 72/53 |
| 2020/0022089 A1* | 1/2020 | Guo | H04L 1/1812 |
| 2020/0029318 A1* | 1/2020 | Guo | H04L 1/1822 |
| 2020/0228247 A1* | 7/2020 | Guo | H04W 52/383 |
| 2020/0236730 A1* | 7/2020 | Shin | H04W 56/001 |

FOREIGN PATENT DOCUMENTS

| | | |
|---|---|---|
| CN | 105553612 A | 5/2016 |
| CN | 105940630 A | 9/2016 |
| CN | 106411475 A | 2/2017 |
| CN | 107404368 A | 11/2017 |
| CN | 107926037 A | 4/2018 |
| CN | 108322414 A | 7/2018 |
| CN | 108347321 A | 7/2018 |
| CN | 109075921 A | 12/2018 |
| IN | 201837035132 A | 10/2018 |
| WO | WO-2018/137514 A1 | 8/2018 |

\* cited by examiner

HARQ FEEDBACK TECHNIQUE FOR COMMUNICATION SYSTEMS

FIELD OF THE INVENTION

The present application relates to a method, apparatus, system and computer program. In particular, but not exclusively, the present application relates to providing feedback for device to device transmissions.

BACKGROUND

A communication system can be seen as a facility that enables communication sessions between two or more entities such as user terminals, base stations and/or other nodes by providing carriers between the various entities involved in the communications path. A communication system can be provided, for example, by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system, at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. Standardization of 5G or New Radio networks is currently under discussion. LTE is being standardized by the 3rd Generation Partnership Project (3GPP).

SUMMARY

According to a first aspect, there is provided an apparatus comprising means for: storing a resource pattern in a set of transmission resources, wherein said resource pattern is associated with a further device; causing a transmission of data to a group of devices; and receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the apparatus comprises means for determining the resource pattern in the set of transmission resources in dependence upon an identifier of the further apparatus.

In some examples, the apparatus comprises means for determining the resource pattern in the set of transmission resources by applying at least one hash function to the identifier to determine index positions in the set of transmission resources.

In some examples, the apparatus comprises means for: identifying in the received transmission feedback, transmission feedback from the further device in response to identifying the activation pattern in the received transmission feedback that matches the stored resource pattern; and in response to identifying the transmission feedback from the further device, causing a retransmission of the data to the further device.

In some examples, the apparatus comprises means for: identifying in the received transmission feedback, transmission feedback from the further device in response to identifying the activation pattern in the received transmission feedback that matches the stored resource pattern; in response to identifying the transmission feedback from the further device, allocating the further device to a sub-group of the group of devices; and subsequently, causing transmissions of further data to the further device using transmission parameters associated with the sub-group, wherein the transmission parameters associated with the sub-group are different to transmission parameters used for the transmission of the data to the further device.

In some examples, the apparatus comprises means for, in response to determining based on the received transmission feedback that a number of failed transmissions for the group exceeds a threshold, causing a retransmission of the data to each of the devices of the group.

In some examples, the apparatus comprises means for, for each of a plurality of the group of devices: storing a resource pattern in the set of transmission resources, wherein the respective resource pattern is associated with the respective device; and identifying in the received transmission feedback, transmission feedback from the respective device in response to identifying an activation pattern in the received transmission feedback that matches the stored resource pattern for the respective device.

In some examples, the apparatus comprises means for, in response to determining based on the transmission feedback that a number of failed transmissions for the group does not exceed a threshold, causing a dedicated retransmission of the data to each device of the group for which a failure to successfully decode the data is indicated in the received transmission feedback without retransmitting to every device in the group.

According to a second aspect, there is provided an apparatus comprising means for: storing a resource pattern in a set of transmission resources, wherein said resource pattern is associated with the apparatus; receiving a transmission of data from a further apparatus, said transmission made to a group of devices comprising the apparatus; and sending transmission feedback to the further apparatus in a resource pattern matching the stored resource pattern, wherein the transmission feedback has at least some overlap in transmission resources with transmission feedback sent from other devices of the group of devices.

In some examples, the apparatus comprises means for, following the transmission of the transmission feedback to the further apparatus, receiving a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the apparatus comprises means for receiving an indication of the set of transmission resources from the further apparatus.

In some examples, the transmission feedback comprises a negative acknowledgment, the apparatus comprising means for, following the transmission of the negative acknowledgment to the further apparatus: receiving an indication that the apparatus is allocated to a sub-group of the group of devices; and subsequently, receiving further data from the further apparatus using transmission parameters associated with the sub-group, wherein the transmission parameters associated with the sub-group are different to transmission parameters used for transmission of the data from the further apparatus.

In some examples, the apparatus comprises means for determining the resource pattern in the set of resources in dependence upon an identifier of the further apparatus.

In some examples, the apparatus comprises means for transmitting the identifier of the apparatus to the further apparatus.

In some examples, the apparatus comprises means for determining the resource pattern in the indicated set of resources by applying at least one hash function to the identifier to output index positions into the set of transmission resources.

In some examples, the transmission feedback comprises at least one of: acknowledgments and negative acknowledgements.

According to a third aspect, there is provided a method comprising: storing a resource pattern in a set of transmission resources, wherein said resource pattern is associated with a further device; causing a transmission of data to a group of devices; and receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the method comprises determining the resource pattern in the set of transmission resources in dependence upon an identifier of the further apparatus.

In some examples, the method comprises determining the resource pattern in the set of transmission resources by applying at least one hash function to the identifier to determine index positions in the set of transmission resources.

In some examples, the method comprises identifying in the received transmission feedback, transmission feedback from the further device in response to identifying the activation pattern in the received transmission feedback that matches the stored resource pattern; and in response to identifying the transmission feedback from the further device, causing a retransmission of the data to the further device.

In some examples, the method comprises identifying in the received transmission feedback, transmission feedback from the further device in response to identifying the activation pattern in the received transmission feedback that matches the stored resource pattern; in response to identifying the transmission feedback from the further device, allocating the further device to a sub-group of the group of devices; and subsequently, causing transmissions of further data to the further device using transmission parameters associated with the sub-group, wherein the transmission parameters associated with the sub-group are different to transmission parameters used for the transmission of the data to the further device.

In some examples, the method comprises, in response to determining based on the received transmission feedback that a number of failed transmissions for the group exceeds a threshold, causing a retransmission of the data to each of the devices of the group.

In some examples, the method comprises, for each of a plurality of the group of devices: storing a resource pattern in the set of transmission resources, wherein the respective resource pattern is associated with the respective device; and identifying in the received transmission feedback, transmission feedback from the respective device in response to identifying an activation pattern in the received transmission feedback that matches the stored resource pattern for the respective device.

In some examples, the method comprises, in response to determining based on the transmission feedback that a number of failed transmissions for the group does not exceed a threshold, causing a dedicated retransmission of the data to each device of the group for which a failure to successfully decode the data is indicated in the received transmission feedback without retransmitting to every device in the group.

According to a fourth aspect, there is provided a method comprising: storing a resource pattern in a set of transmission resources, wherein said resource pattern is associated with an apparatus; receiving a transmission of data from a further apparatus, said transmission made to a group of devices comprising the apparatus; and sending transmission feedback to the further apparatus in a resource pattern matching the stored resource pattern, wherein the transmission feedback has at least some overlap in transmission resources with transmission feedback sent from other devices of the group of devices.

In some examples, the method comprises following the transmission of the transmission feedback to the further apparatus, receiving a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the method comprises means for receiving an indication of the set of transmission resources from the further apparatus.

In some examples, the transmission feedback comprises a negative acknowledgment, the method comprising, following the transmission of the negative acknowledgment to the further apparatus: receiving an indication that the apparatus is allocated to a sub-group of the group of devices; and subsequently, receiving further data from the further apparatus using transmission parameters associated with the sub-group, wherein the transmission parameters associated with the sub-group are different to transmission parameters used for transmission of the data from the further apparatus.

In some examples, the method comprises determining the resource pattern in the set of resources in dependence upon an identifier of the further apparatus.

In some examples, the method comprises transmitting the identifier of the apparatus to the further apparatus.

In some examples, the method comprises determining the resource pattern in the indicated set of resources by applying at least one hash function to the identifier to output index positions into the set of transmission resources.

In some examples, the transmission feedback comprises at least one of: acknowledgments and negative acknowledgements.

According to a fifth aspect, there is provided a computer program comprising instructions for causing an apparatus to perform at least: storing a resource pattern in a set of transmission resources, wherein said resource pattern is associated with a further device; causing a transmission of data to a group of devices; and receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the computer program comprises instructions for causing the apparatus to perform at least: determining the resource pattern in the set of transmission resources in dependence upon an identifier of the further apparatus.

In some examples, the computer program comprises instructions for causing the apparatus to perform at least: determining the resource pattern in the set of transmission resources by applying at least one hash function to the identifier to determine index positions in the set of transmission resources.

In some examples, the computer program comprises instructions for causing the apparatus to perform at least: identifying in the received transmission feedback, transmission feedback from the further device in response to identifying the activation pattern in the received transmission feedback that matches the stored resource pattern; and in response to identifying the transmission feedback from the further device, causing a retransmission of the data to the further device.

In some examples, the computer program comprises instructions for causing the apparatus to perform at least: identifying in the received transmission feedback, transmission feedback from the further device in response to identifying the activation pattern in the received transmission feedback that matches the stored resource pattern; in response to identifying the transmission feedback from the further device, allocating the further device to a sub-group of the group of devices; and subsequently, causing transmissions of further data to the further device using transmission parameters associated with the sub-group, wherein the transmission parameters associated with the sub-group are different to transmission parameters used for the transmission of the data to the further device.

In some examples, the computer program comprises instructions for causing the apparatus to perform at least: in response to determining based on the received transmission feedback that a number of failed transmissions for the group exceeds a threshold, causing a retransmission of the data to each of the devices of the group.

In some examples, the computer program comprises instructions for causing the apparatus to perform at least, for each of a plurality of the group of devices: storing a resource pattern in the set of transmission resources, wherein the respective resource pattern is associated with the respective device; and identifying in the received transmission feedback, transmission feedback from the respective device in response to identifying an activation pattern in the received transmission feedback that matches the stored resource pattern for the respective device.

In some examples, the computer program comprises instructions for causing the apparatus to perform at least: in response to determining based on the transmission feedback that a number of failed transmissions for the group does not exceed a threshold, causing a dedicated retransmission of the data to each device of the group for which a failure to successfully decode the data is indicated in the received transmission feedback without retransmitting to every device in the group.

According to a sixth aspect, there is provided a computer program comprising instructions for causing an apparatus to perform at least: storing a resource pattern in a set of transmission resources, wherein said resource pattern is associated with an apparatus; receiving a transmission of data from a further apparatus, said transmission made to a group of devices comprising the apparatus; and sending transmission feedback to the further apparatus in a resource pattern matching the stored resource pattern, wherein the transmission feedback has at least some overlap in transmission resources with transmission feedback sent from other devices of the group of devices.

In some examples, the computer program comprises instructions for causing the apparatus to perform at least: following the transmission of the transmission feedback to the further apparatus, receiving a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the computer program comprises instructions for causing the apparatus to perform at least: receiving an indication of the set of transmission resources from the further apparatus.

In some examples, the transmission feedback comprises a negative acknowledgment, the computer program comprising instructions for causing the apparatus to perform at least: following the transmission of the negative acknowledgment to the further apparatus: receiving an indication that the apparatus is allocated to a sub-group of the group of devices; and subsequently, receiving further data from the further apparatus using transmission parameters associated with the sub-group, wherein the transmission parameters associated with the sub-group are different to transmission parameters used for transmission of the data from the further apparatus.

In some examples, the computer program comprises instructions for causing the apparatus to perform at least: determining the resource pattern in the set of resources in dependence upon an identifier of the further apparatus.

In some examples, the computer program comprises instructions for causing the apparatus to perform at least: transmitting the identifier of the apparatus to the further apparatus.

In some examples, the computer program comprises instructions for causing the apparatus to perform at least: determining the resource pattern in the indicated set of resources by applying at least one hash function to the identifier to output index positions into the set of transmission resources.

In some examples, the transmission feedback comprises at least one of: acknowledgments and negative acknowledgements.

According to an seventh aspect, there is provided a non-transitory computer readable medium comprising program instructions for causing an apparatus to perform at least the following: storing a resource pattern in a set of transmission resources, wherein said resource pattern is associated with a further device; causing a transmission of data to a group of devices; and receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the non-transitory computer readable medium comprises program instructions for causing an apparatus to perform at least the following: determining the resource pattern in the set of transmission resources in dependence upon an identifier of the further apparatus.

In some examples, the non-transitory computer readable medium comprises program instructions for causing an apparatus to perform at least the following: determining the resource pattern in the set of transmission resources by applying at least one hash function to the identifier to determine index positions in the set of transmission resources.

In some examples, the non-transitory computer readable medium comprises program instructions for causing an apparatus to perform at least the following: identifying in the received transmission feedback, transmission feedback from the further device in response to identifying the activation pattern in the received transmission feedback that matches the stored resource pattern; and in response to identifying the transmission feedback from the further device, causing a retransmission of the data to the further device.

In some examples, the non-transitory computer readable medium comprises program instructions for causing an apparatus to perform at least the following: identifying in the received transmission feedback, transmission feedback from the further device in response to identifying the activation pattern in the received transmission feedback that matches the stored resource pattern; in response to identifying the transmission feedback from the further device, allocating the further device to a sub-group of the group of devices; and subsequently, causing transmissions of further data to the further device using transmission parameters associated with the sub-group, wherein the transmission parameters associated with the sub-group are different to transmission parameters used for the transmission of the data to the further device.

In some examples, the non-transitory computer readable medium comprises program instructions for causing an apparatus to perform at least the following: in response to determining based on the received transmission feedback that a number of failed transmissions for the group exceeds a threshold, causing a retransmission of the data to each of the devices of the group.

In some examples, the non-transitory computer readable medium comprises program instructions for causing an apparatus to perform at least the following, for each of a plurality of the group of devices: storing a resource pattern in the set of transmission resources, wherein the respective resource pattern is associated with the respective device; and identifying in the received transmission feedback, transmission feedback from the respective device in response to identifying an activation pattern in the received transmission feedback that matches the stored resource pattern for the respective device.

In some examples, the non-transitory computer readable medium comprises program instructions for causing an apparatus to perform at least the following: in response to determining based on the transmission feedback that a number of failed transmissions for the group does not exceed a threshold, causing a dedicated retransmission of the data to each device of the group for which a failure to successfully decode the data is indicated in the received transmission feedback without retransmitting to every device in the group.

According to an eighth aspect, there is provided a non-transitory computer readable medium comprising program instructions for causing an apparatus to perform at least the following: storing a resource pattern in a set of transmission resources, wherein said resource pattern is associated with an apparatus; receiving a transmission of data from a further apparatus, said transmission made to a group of devices comprising the apparatus; and sending transmission feedback to the further apparatus in a resource pattern matching the stored resource pattern, wherein the transmission feedback has at least some overlap in transmission resources with transmission feedback sent from other devices of the group of devices.

In some examples, the non-transitory computer readable medium comprises program instructions for causing an apparatus to perform at least the following: following the transmission of the transmission feedback to the further apparatus, receiving a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the non-transitory computer readable medium comprises program instructions for causing an apparatus to perform at least the following: receiving an indication of the set of transmission resources from the further apparatus.

In some examples, the transmission feedback comprises a negative acknowledgment, the non-transitory computer readable medium comprising program instructions for causing an apparatus to perform at least the following: following the transmission of the negative acknowledgment to the further apparatus: receiving an indication that the apparatus is allocated to a sub-group of the group of devices; and subsequently, receiving further data from the further apparatus using transmission parameters associated with the sub-group, wherein the transmission parameters associated with the sub-group are different to transmission parameters used for transmission of the data from the further apparatus.

In some examples the non-transitory computer readable medium comprises program instructions for causing an apparatus to perform at least the following: determining the resource pattern in the set of resources in dependence upon an identifier of the further apparatus.

In some examples, the non-transitory computer readable medium comprises program instructions for causing an apparatus to perform at least the following: transmitting the identifier of the apparatus to the further apparatus.

In some examples, the non-transitory computer readable medium comprises program instructions for causing an apparatus to perform at least the following: determining the resource pattern in the indicated set of resources by applying at least one hash function to the identifier to output index positions into the set of transmission resources.

In some examples, the transmission feedback comprises at least one of: acknowledgments and negative acknowledgements.

According to a ninth aspect, there is provided an apparatus comprising: at least one processor and at least one memory comprising code that, when executed by the at least one processor, causes the apparatus to: store a resource pattern in a set of transmission resources, wherein said resource pattern is associated with a further device; cause a transmission of data to a group of devices; and receive transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the at least one memory comprises code that, when executed by the at least one processor, causes the apparatus to determine the resource pattern in the set of transmission resources in dependence upon an identifier of the further apparatus.

In some examples, the at least one memory comprises code that, when executed by the at least one processor, causes the apparatus to determine the resource pattern in the set of transmission resources by applying at least one hash function to the identifier to determine index positions in the set of transmission resources.

In some examples the at least one memory comprises code that, when executed by the at least one processor, causes the apparatus to: identify in the received transmission feedback, transmission feedback from the further device in response to identifying the activation pattern in the received transmission feedback that matches the stored resource pattern; and in response to identifying the transmission feedback from the further device, cause a retransmission of the data to the further device.

In some examples, the at least one memory comprises code that, when executed by the at least one processor, causes the apparatus to: identify in the received transmission feedback, transmission feedback from the further device in response to identifying the activation pattern in the received transmission feedback that matches the stored resource pattern; in response to identifying the transmission feedback from the further device, allocate the further device to a sub-group of the group of devices; and subsequently, cause transmissions of further data to the further device using transmission parameters associated with the sub-group, wherein the transmission parameters associated with the sub-group are different to transmission parameters used for the transmission of the data to the further device.

In some examples, the at least one memory comprises code that, when executed by the at least one processor, causes the apparatus to, in response to determining based on the received transmission feedback that a number of failed transmissions for the group exceeds a threshold, causing a retransmission of the data to each of the devices of the group.

In some examples, the at least one memory comprises code that, when executed by the at least one processor, causes the apparatus to, for each of a plurality of the group of devices: store a resource pattern in the set of transmission resources, wherein the respective resource pattern is associated with the respective device; and identify in the received transmission feedback, transmission feedback from the respective device in response to identifying an activation pattern in the received transmission feedback that matches the stored resource pattern for the respective device.

In some examples, the at least one memory comprises code that, when executed by the at least one processor, causes the apparatus to, in response to determining based on the transmission feedback that a number of failed transmissions for the group does not exceed a threshold, cause a dedicated retransmission of the data to each device of the group for which a failure to successfully decode the data is indicated in the received transmission feedback without retransmitting to every device in the group.

According to a tenth aspect, there is provided an apparatus comprising: at least one processor; and at least one memory comprising code that, when executed by the at least one processor, causes the apparatus to: store a resource pattern in a set of transmission resources, wherein said resource pattern is associated with an apparatus; receive a transmission of data from a further apparatus, said transmission made to a group of devices comprising the apparatus; and send transmission feedback to the further apparatus in a resource pattern matching the stored resource pattern, wherein the transmission feedback has at least some overlap in transmission resources with transmission feedback sent from other devices of the group of devices.

In some examples, the at least one memory comprises code that, when executed by the at least one processor, causes the apparatus to, following the transmission of the transmission feedback to the further apparatus, receive a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the at least one memory comprises code that, when executed by the at least one processor, causes the apparatus to receive an indication of the set of transmission resources from the further apparatus.

In some examples, the transmission feedback comprises a negative acknowledgment, the at least one memory comprising code that, when executed by the at least one processor, causes the apparatus to, following the transmission of the negative acknowledgment to the further apparatus: receive an indication that the apparatus is allocated to a sub-group of the group of devices; and subsequently, receive further data from the further apparatus using transmission parameters associated with the sub-group, wherein the transmission parameters associated with the sub-group are different to transmission parameters used for transmission of the data from the further apparatus.

In some examples, the at least one memory comprises code that, when executed by the at least one processor, causes the apparatus to determine the resource pattern in the set of resources in dependence upon an identifier of the further apparatus.

In some examples, the at least one memory comprises code that, when executed by the at least one processor, causes the apparatus to transmit the identifier of the apparatus to the further apparatus.

In some examples, the at least one memory comprises code that, when executed by the at least one processor, causes the apparatus to determine the resource pattern in the indicated set of resources by applying at least one hash function to the identifier to output index positions into the set of transmission resources.

In some examples, the transmission feedback comprises at least one of: acknowledgments and negative acknowledgements.

According to an eleventh aspect, there is provided an apparatus comprising: storing circuitry for storing a resource pattern in a set of transmission resources, wherein said resource pattern is associated with a further device; transmitting circuitry for causing a transmission of data to a group of devices; and receiving circuitry for receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with the transmission feedback received from other devices of said plurality of devices.

In some examples, the apparatus comprises determining circuitry for determining the resource pattern in the set of transmission resources in dependence upon an identifier of the further apparatus.

In some examples, the determining circuitry determines the resource pattern in the set of transmission resources by applying at least one hash function to the identifier to determine index positions in the set of transmission resources.

In some examples, the apparatus comprises: identifying circuitry for identifying in the received transmission feedback, transmission feedback from the further device in response to identifying the activation pattern in the received transmission feedback that matches the stored resource pattern; and retransmission circuitry for, in response to identifying the transmission feedback from the further device, causing a retransmission of the data to the further device.

In some examples, the apparatus comprises: identifying circuitry for identifying in the received transmission feedback, transmission feedback from the further device in response to identifying the activation pattern in the received transmission feedback that matches the stored resource pattern; allocating circuitry for, in response to identifying the transmission feedback from the further device, allocating the further device to a sub-group of the group of devices; and transmitting circuitry for, subsequently, causing transmissions of further data to the further device using transmission parameters associated with the sub-group, wherein the transmission parameters associated with the sub-group are different to transmission parameters used for the transmission of the data to the further device.

In some examples, the apparatus comprises retransmission circuitry for, in response to determining based on the received transmission feedback that a number of failed transmissions for the group exceeds a threshold, causing a retransmission of the data to each of the devices of the group.

In some examples, the apparatus comprises: storing circuitry for storing a resource pattern in the set of transmission resources, wherein the respective resource pattern is associated with the respective device; and identifying circuitry for identifying in the received transmission feedback, transmission feedback from the respective device in response to identifying an activation pattern in the received transmission feedback that matches the stored resource pattern for the respective device.

In some examples, the apparatus comprises, retransmitting circuitry for, in response to determining based on the transmission feedback that a number of failed transmissions for the group does not exceed a threshold, causing a dedicated retransmission of the data to each device of the group for which a failure to successfully decode the data is indicated in the received transmission feedback without retransmitting to every device in the group.

According to a twelfth aspect, there is provided an apparatus comprising: storing circuitry for storing a resource pattern in a set of transmission resources, wherein said resource pattern is associated with an apparatus; receiving circuitry for receiving a transmission of data from a further apparatus, said transmission made to a group of devices comprising the apparatus; and sending circuitry for sending transmission feedback to the further apparatus in a resource pattern matching the stored resource pattern, wherein the transmission feedback has at least some overlap in transmission resources with transmission feedback sent from other devices of the group of devices.

In some examples, the apparatus comprises receiving circuitry for, following the transmission of the transmission feedback to the further apparatus, receiving a retransmission comprising the data from the further apparatus.

In some examples, the retransmission comprises at least one of: a transmission sent to every device in the group; and a dedicated retransmission not sent to every device in the group.

In some examples, if the transmission feedback comprises an acknowledgment, the retransmission comprises the transmission sent to every device in the group.

In some examples, the apparatus comprises receiving circuitry for receiving an indication of the set of transmission resources from the further apparatus.

In some examples, the transmission feedback comprises a negative acknowledgment, and the apparatus comprises: receiving circuitry for, following the transmission of the negative acknowledgment to the further apparatus, receiving an indication that the apparatus is allocated to a sub-group of the group of devices; and receiving circuitry for, subsequently, receiving further data from the further apparatus using transmission parameters associated with the sub-group, wherein the transmission parameters associated with the sub-group are different to transmission parameters used for transmission of the data from the further apparatus.

In some examples, the apparatus comprises determining circuitry for determining the resource pattern in the set of resources in dependence upon an identifier of the further apparatus.

In some examples, the apparatus comprises transmitting circuitry for transmitting the identifier of the apparatus to the further apparatus.

In some examples, the apparatus comprises determining circuitry for determining the resource pattern in the indicated set of resources by applying at least one hash function to the identifier to output index positions into the set of transmission resources.

In some examples, the transmission feedback comprises at least one of: acknowledgments and negative acknowledgements.

According to a thirteenth aspect, there is provided an apparatus configured to perform the actions of any method as described above.

According to a fourteenth aspect, there is provided a computer program comprising program instructions for causing a computer to perform any method as described above.

According to a fifteenth aspect, there is provided a computer program product stored on a medium that may cause an apparatus to perform any method as described herein.

According to a sixteenth aspect, there is provided an electronic device that may comprise apparatus as described herein.

According to a seventeenth aspect, there is provided a chipset that may comprise an apparatus as described herein.

DESCRIPTION OF FIGURES

Some examples will now be described with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
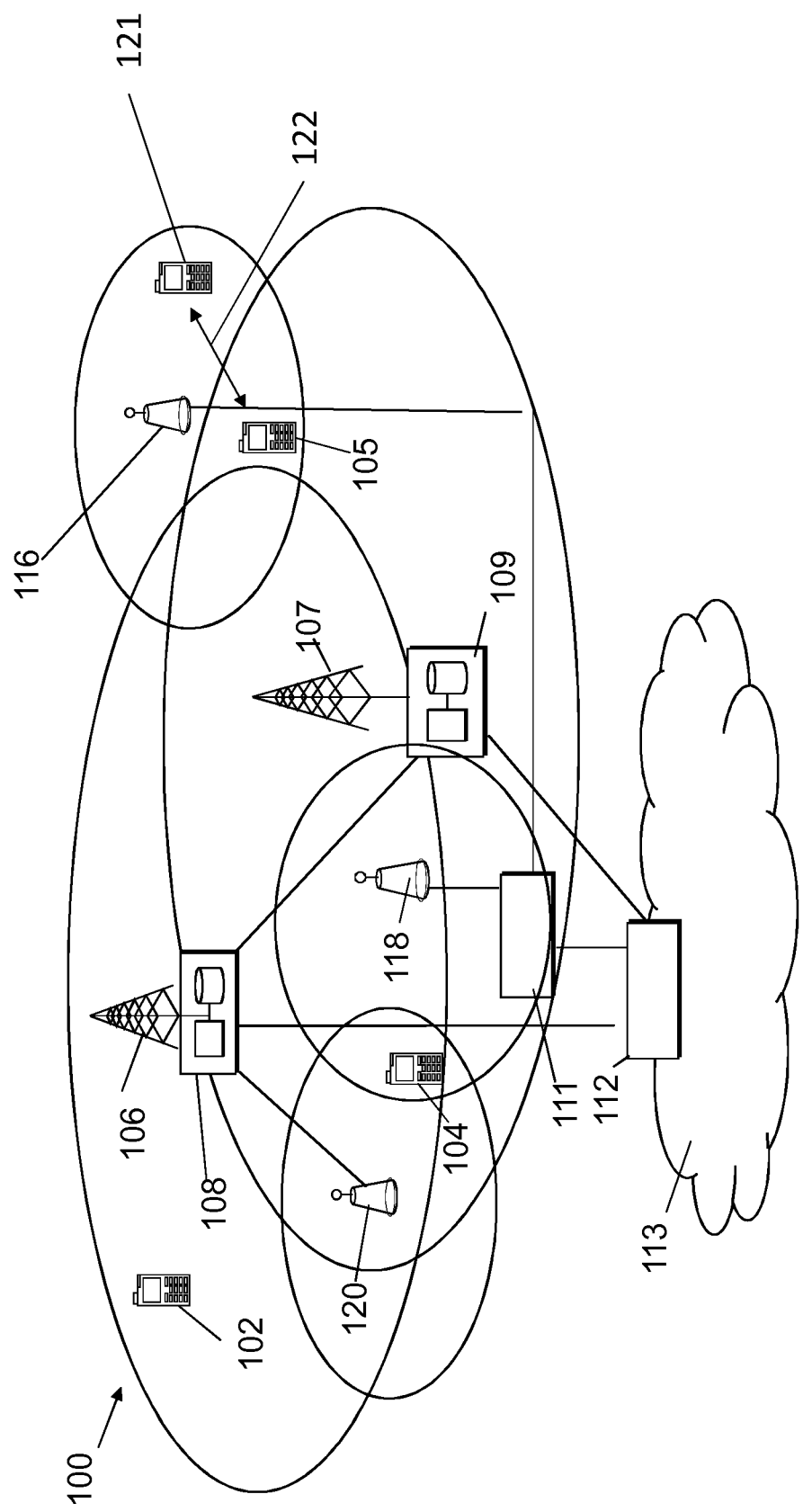
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1, base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some example embodiments, the smaller stations may not be provided. Smaller base stations 116, 118 and 120 may be part of a second network, for example WLAN and may be WLAN APs.

An example of wireless communication systems are architectures standardized by the 3rd Generation Partnership Project (3GPP). A 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 2:
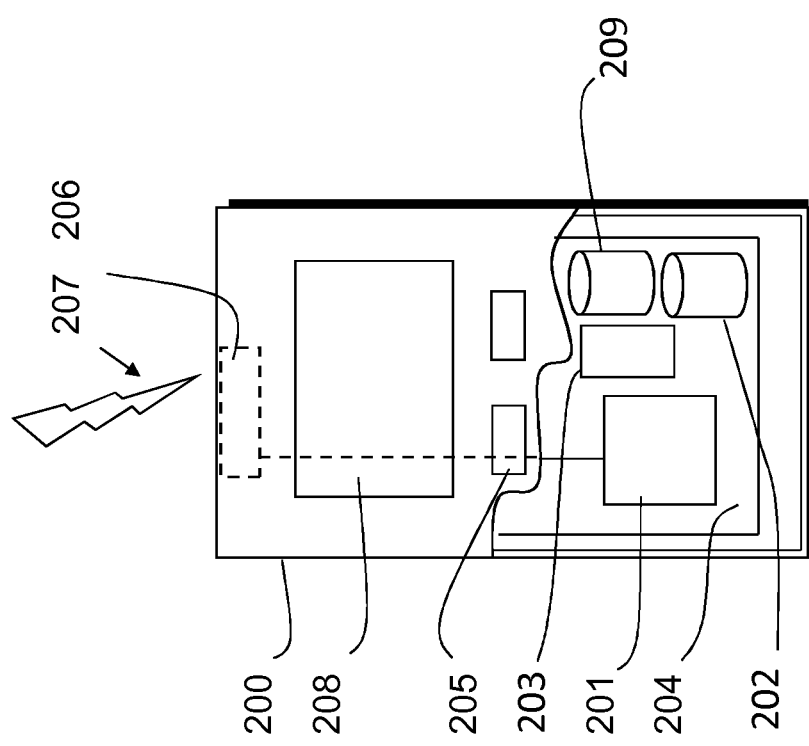
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as a user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

The mobile device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means of a radio part and associated antenna arrangement. The antenna arrangement may be arranged internally or externally to the mobile device.

The mobile device 200 is typically provided with at least one data processing entity 201, at least one random access memory 202, at least one read only memory 209, and other possible components 203 for use in software and hardware aided execution of tasks it is designed to perform, including control of access to and communications with access systems and other communication devices. The at least one random access memory 202 and the at least one read only memory 209 may be in communication with the data processing entity 201, which may be a data processor. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
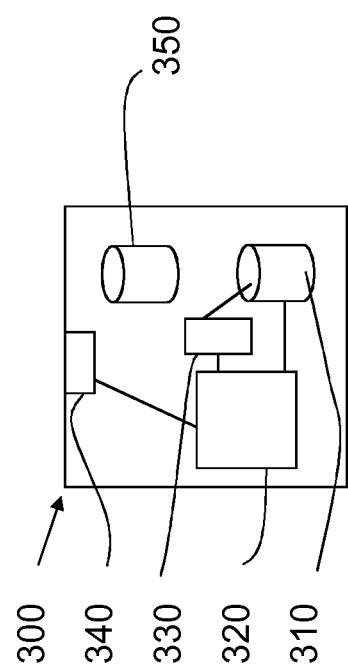
FIG. 3 shows a schematic diagram of an example control apparatus.

FIG. 3 shows an example of a control apparatus for a communication system, for example to be coupled to and/or for controlling a station of an access system, such as a RAN node, e.g. a base station, (e) node B or 5G AP, or a node of a core network such as an MME or S-GW, or a server or host. The method may be implemented in a single control apparatus or across more than one control apparatus. The control apparatus may be integrated with or external to a node or module of a core network or RAN. In some example embodiments, base stations comprise a separate control apparatus unit or module. In other example embodiments, the control apparatus can be another network element such as a radio network controller or a spectrum controller. In some example embodiments, each base station may have such a control apparatus as well as a control apparatus being provided in a radio network controller. The control apparatus 300 can be arranged to provide control on communications in the service area of the system. The control apparatus 300 comprises at least one random access memory 310, at least one read only memory 350 at least one data processing unit 320, 330 and an input/output interface 340. Via the interface, the control apparatus can be coupled to a receiver and a transmitter of the base station. The receiver and/or the transmitter may be implemented as a radio front end or a remote radio head.

Devices typically communicate with each other via sending and receiving communications with the base station. However, another form of communication, known as device-to-device (D2D) communication, may be used. In D2D communication, data is exchanged between two devices without traversing the base station or the core network. Sidelink is an LTE feature introduced in 3GPP Release 12 aimed at enabling device-to-device (D2D) communications within legacy cellular-based LTE radio access networks. Sidelink enables direct communication between proximal UEs using the newly defined PC5 interface, so that data does not need to traverse the eNB.

For example, referring back to FIG. 1, a communication device 121 is shown exchanging D2D communications 122 with the device 105. These communications are exchanged between the devices, without being routed via the base station 116.

Sidelink D2D communications are applicable to public safety and commercial communication use-cases, and recently (in 3GPP Release 14) to vehicle-to-vehicle (V2V) scenarios and (in 3GPP Release 14) to vehicle-to-everything (V2X) scenarios.

In 3GPP, an ongoing study item on NR V2X communications is aiming to meet the requirements of advanced V2X services. These requirements include the support of sidelink unicast, sidelink groupcast and sidelink broadcast. The study item also involves consideration of NR sidelink physical layer structures and procedure(s), the sidelink synchronization mechanism, the sidelink resource allocation mechanism, and sidelink L2/L3 protocols.

In sidelink communications, data may be transmitted from a device to a single device. This type of communication is referred to as unicast, and is illustrated as taking place between device 121 and device 105 in FIG. 1. Alternatively, data may be transmitted from a device to multiple devices within a group. This type of communication is referred to as groupcast, and is illustrated in FIG. 4.

Figure 4:
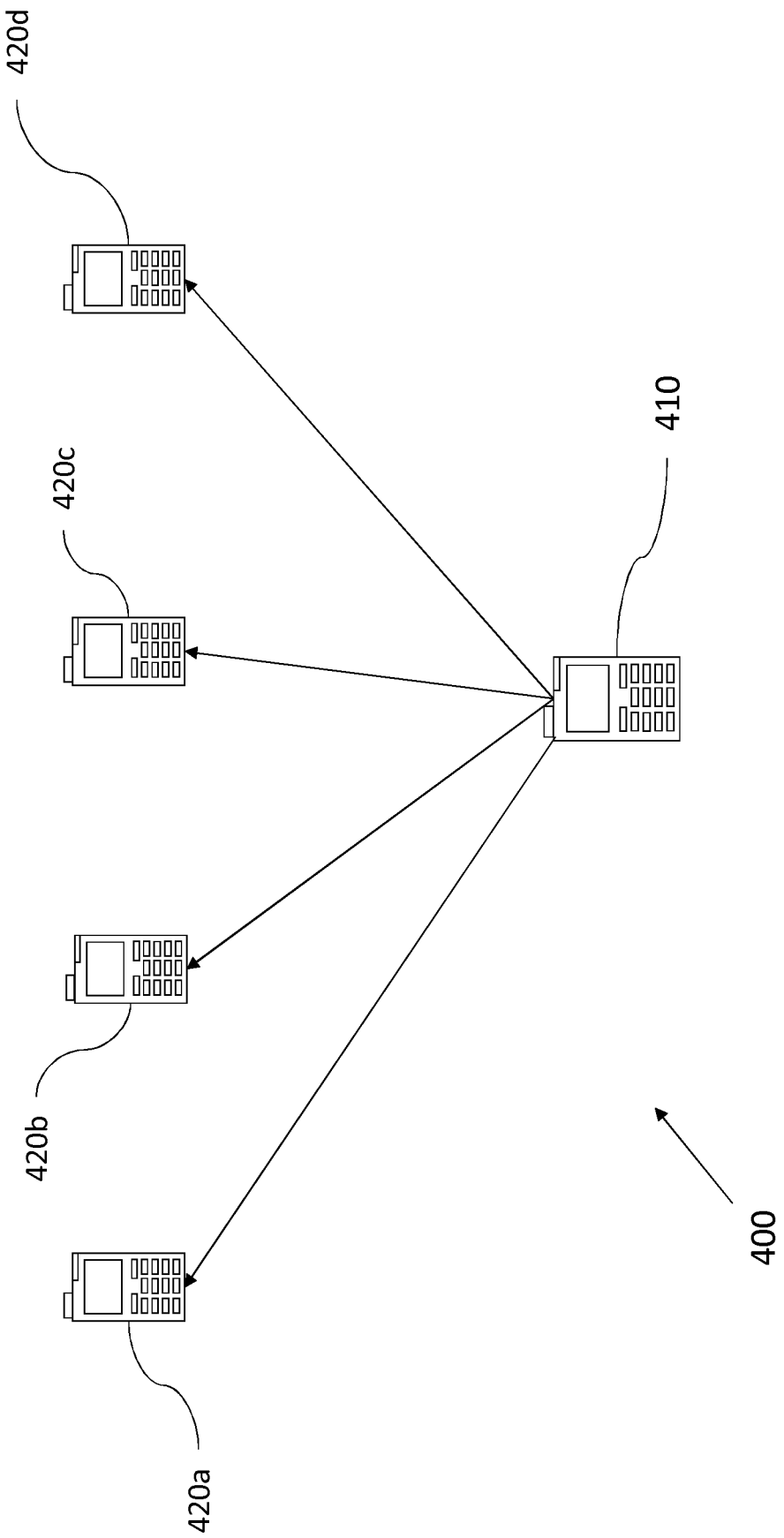
FIG. 4 shows a schematic diagram of groupcast device to device communication.

Reference is made to FIG. 4, which illustrates an example of groupcast D2D communications in a communication system 400. The communication system 400 includes a first device 410 and a group comprising devices 420a, 420b, 420c, 420d (collectively referred to as group of devices 420). The first device 410 in this example is configured to perform a groupcast transmission to each of the devices in the group of devices 420.

Prior to performing the groupcast transmission, the first device 410 transmits sidelink control information (SCI) in a physical sidelink control channel (PSCCH) to the devices 420. The SCI comprises the information that each of the devices requires to be able to receive and demodulate the data that is to be transmitted in the upcoming groupcast transmission. The SCI comprises an indication of the transmission resources to be used for transmitting the data. The SCI comprises an indication of the modulation and coding scheme to be used for transmitting the data.

After the transmission of the SCI, the first device 410 transmits the data of the groupcast transmission to each of the devices 420. The data is transmitted in a physical sidelink shared channel (PSSCH). The data is transmitted in the PSSCH in one or more transmission blocks to the devices 420

Each of the devices 420 receives and attempts to decode the data transmitted by the first device 410. Each of the devices 420 provides transmission feedback to the first device 410. The transmission feedback indicates whether or not the data transmitted by the first device was successfully received and decoded by the respective device. The transmission feedback is preferably hybrid automatic repeat request (HARQ) feedback. The transmission feedback provided by a device, e.g. device 420a, may comprise an acknowledgment (ACK) in the case that the device 420a received and successfully decoded the data transmitted from the first device 410. The transmission feedback provided by device 420a may comprise a negative acknowledgment (NACK) in the case that the device 420a did not successfully decode the data transmitted from the first device 410.

In some examples, one of the ACKs or NACKs may be omitted from the transmission feedback. For example, a device 420a may be configured to transmit an ACK if it successfully decodes the data, but not to transmit a NACK in the case that the decoding is unsuccessful. In this case, the transmitting device 410 is configured to determine that decoding is unsuccessful in response to determining that no ACK has been received a predefined time after transmission of the data. On the other hand, in some examples, the device 420a may be configured to transmit a NACK if decoding of the data is unsuccessful, but not to transmit an ACK in the case that the decoding is successful. In this case, the transmitting device 410 is configured to determine that decoding is successful in response to determining that no NACK has been received for the transmission of the data after a predefined amount of time since the transmission of that data.

For sidelink communications, in the case of non-code block operation, two options for providing transmission feedback are provided. According to a first option, the receiving device transmits a HARQ-NACK on the physical sidelink feedback channel (PSFCH) if it fails to decode the corresponding transport block after decoding the associated PSCCH, but does not transmit a HARQ-ACK if it is successful in decoding. According to a second option, the receiving device transmits HARQ-ACK on the PSFCH if it successfully decodes the corresponding transport block. The receiver transmits HARQ-NACK on the PSFCH if it does not successfully decode the corresponding transport block after decoding the associated PSCCH. According to example embodiments of the application, either of these two options may be applied when providing transmission feedback.

Figure 10:
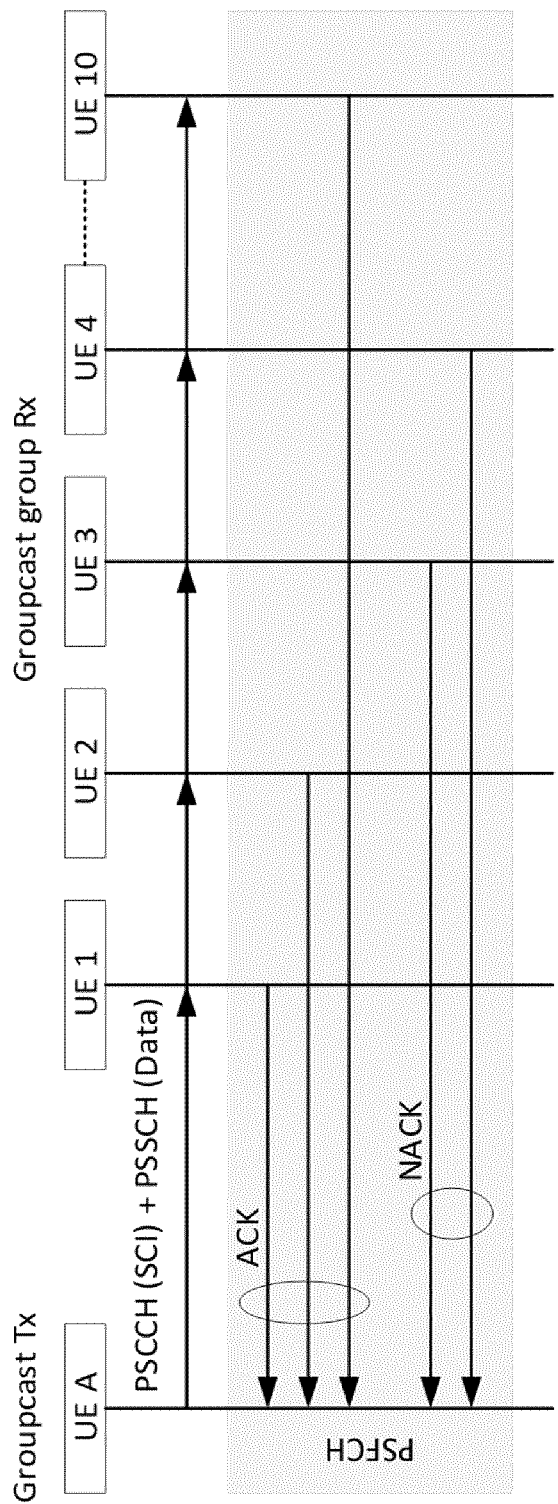
FIG. 10 illustrates an example of a message sequence diagram showing groupcast transmission of data.

Reference is made to FIG. 10, which illustrates a message sequence diagram showing a groupcast sidelink transmission and the corresponding transmission feedback.

A device (UE A) is configured to transmit the SCI, followed by the data, to each of the devices (UE 1 to 10) in the groupcast group. The devices then transmit feedback to UE A. In this example, the UEs 1, 2, and 10 are configured to transmit ACKs indicating that they successfully received and decoded the data transmitted by UE A. On the other hand, the UEs 3 and 4 are configured to transmit NACKs indicating that they did not successfully decode the data transmitted by UE A. The transmission feedback in this sidelink example is transmitted in the physical sidelink feedback channel (PSFCH).

Transmission feedback (i.e. ACKs and/or NACKs) may, therefore, be provided to a transmitting device, which can take appropriate action, such as performing retransmissions of the data. However, the providing of transmission feedback presents certain challenges.

Firstly, there is a problem with how to efficiently allocate resources for the transmission of the feedback. One proposal is to provide individually dedicated resources for a device to transmit its feedback to the transmitting device. However, providing individually dedicated resources for each device that is configured to transmit feedback requires a large amount of overall resources to be allocated for the transmission of the feedback.

Secondly, there is a problem of how a transmitting device determines which device has failed to decode the received data. In order to address the first problem of inefficient use of resources discussed above, one proposal is to provide a wide-group NACK indicating that at least one device in a group of devices has failed to successfully decode the transmitted data. This has the advantage in that only a small amount of resources are required to transmit such a NACK.

However, such a wide-group NACK is unlikely to provide useful information, since it is likely that at least one device will fail to successfully decode the data and therefore trigger the transmission of the wide-group NACK. The transmitting device receiving such a wide-group NACK knows only that a retransmission is required and has no information about the identity of the devices that require the retransmission.

Hence, there is a need for an improved method for providing feedback from a receiving device to a transmitting device.

One proposal for providing feedback is to provide feedback using shared signalling sequences for a group of devices. In such a group of devices, each device that fails to successfully decode the transmitted data will transmit a NACK in a first signalling sequence in the same resource region. On the other hand, each device that successfully decodes the transmitted data will transmit an ACK in a second signalling sequence in the same resource region. Since the devices transmit at least one shared signalling sequence in the wireless resource at the same time, the transmissions will naturally combine. When the feedback is received at the transmitter, the transmitter compares the ratio of received energy levels of different feedback information (e.g., a ratio of an ACK energy level to a NACK energy level) to determine the proportion of devices that successfully decode the data and the proportion that did not successfully decode the data. This proposal, unlike the transmission of a wide group NACK, allows the transmitter to determine appropriate action by determining how many devices failed to successfully decode the received data. However, the proposal does not enable the transmitter to identify the individual devices that failed to successfully decode the data.

Another proposal is to arrange content data into data blocks and to broadcast each data block using an initial set of rateless transmission symbols. Mobile devices that did not receive a sufficient number of initial symbols respond with a NACK message, and a NACK rate for the broadcast system is monitored. Responsive to the NACK rate, additional symbols may be broadcast or otherwise transmitted. This proposal, as with the other proposals, involves the provision of NACK statistics without allowing the transmitting device to identify which NACKs originated from which devices.

Therefore in the proposals, there are two main strategies for transmission of feedback: (i) use separate dedicated resources for each device in a group; and (ii) use common resources, allowing for overlap of transmissions. As noted, the first of these is inefficient in terms of resource usage. The second of these does not allow the transmitting device to distinguish which feedback has been provided by which device.

Example embodiments of the application may address the above discussed problems.

According to example embodiments of the application, a device receiving a transmission is configured to provide its feedback in a unique resource pattern within a set of resources (i.e. a resource pool). The resource pattern used by the device overlaps partially with one or more resource patterns used for feedback transmissions by other devices in the group. The transmitting device is able to identify the device by identifying an activation pattern matching the unique resource pattern of the device in the overall feedback that it receives from the devices of the group. By matching of the resource pattern of the receiving device to the activation pattern it is meant that the transmitting device determines that the resources of the resource pattern associated with the receiving device are active in the overall transmission feedback received from the devices of the group.

Since there is overlap between transmitted feedback patterns within a common resource pool, more efficient use of resources may be made compared to the case where each device has its own dedicated resources for transmitting its feedback. The common resource pool for transmitting feedback may be made smaller than the case in which each device has its own dedicated resources for transmitting feedback. Furthermore, the use of a unique resource pattern enables the transmitting device to identify which devices are transmitting feedback in the case that only a small number of devices are transmitting feedback. Appropriate action (e.g. a dedicated retransmission) for those small number of devices may then be carried out. In the case that a large number of devices are transmitting feedback indicating a failed transmission, a group re-transmission may be carried out by resending the data to all of the devices in the group.

In more detail, according to example embodiments of the application, a device (i.e. the receiving device) that is configured to receive transmitted data and provide feedback associated with the transmitted data is configured to provide an identifier (ID) of itself to the transmitting device. The transmitting device provides to the receiving device an indication of a set of resources in which the receiving device may transmit its feedback. This set of resources is a common resource pool to be used by all of the devices in the group for transmitting their feedback to the transmitting device. The receiving device applies an algorithm having its identifier as an input. The algorithm provides as an output, an indication of the transmission resources in the resource pool in which the feedback is to be transmitted. The transmission resources for the feedback of the receiving device occupy a unique pattern within the indicated resource pool. When the receiving device transmits its feedback in the unique pattern to the transmitting device, the transmitting device is able to identify that it is the receiving device sending the feedback by identifying the pattern associated with that device in the feedback that it receives. To do so, the transmitting device uses the identifier it received from the receiving device and applies to it the same algorithm applied by the receiving device to determine the expected transmission pattern for the receiving device.

Example embodiments of the application will now be explained in more detail, with reference to the following Figures.

Figure 5:
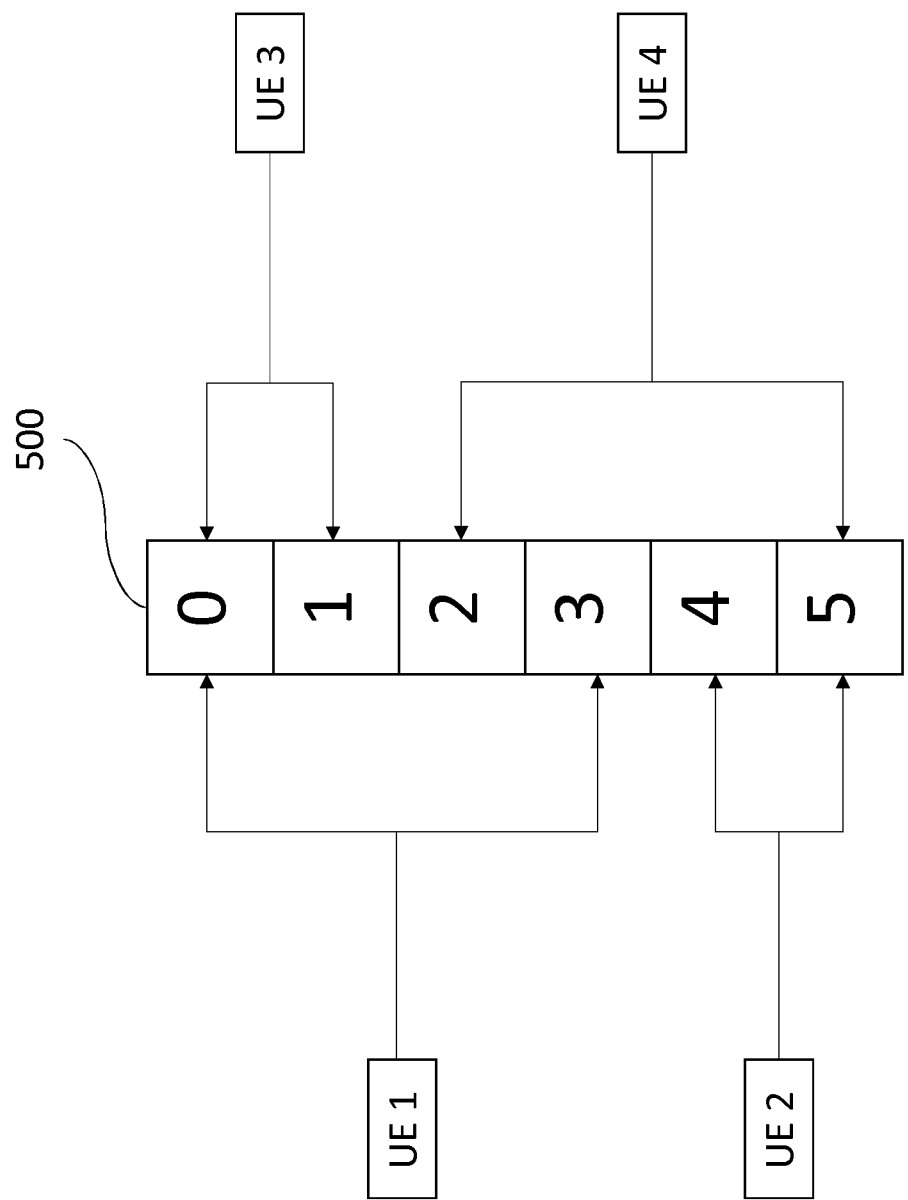
FIG. 5 shows an example of the assignment of resources in a common resource pool for the transmission of transmission feedback.

Reference is made to FIG. 5, which illustrates a set of resources in which different devices of a group of devices may provide their transmission feedback.

The Figure shows a vector 500 of resources. Each element (labelled 0 to 5) in the vector may be a resource element, which can be activated when a device of the group provides its transmission feedback. Four devices of the group are shown. These devices are labelled UE 1 to 4. However, the devices are not limited to being user equipment, but may be devices other than user equipment. Each of the devices is configured to provide its transmission feedback in a plurality of resources in the resource vector 500. There is some overlap between the transmission resources in which different devices are configured to transmit their feedback. However, since each of these device transmits its resources in a unique pattern, the device which transmitted the data (and which receives the feedback) is able to determine which devices transmitted the feedback. The feedback may comprise a NACK. Each of the devices has an associated resource pattern for transmission of feedback in the resources of the vector 500. The resource pattern for each device is indicated by the arrows in FIG. 5. The resource pattern for each device is produced by applying an algorithm to an identifier of the respective device to output index positions. The index positions represent the resource pattern to be used for the transmission of the feedback.

For each device, the algorithm outputs a predefined number of index positions which determine the resources in the resource pool to be used for transmitting the transmission feedback. The resource pattern for each device is computed using any suitable algorithm. The algorithm may determine each resource pattern by randomly selecting a predefined number of index positions in the resource pool. The algorithm used to randomly select these positions for a device may use the identifier of the device as a seed to determine the index positions.

The algorithm may determine each resource pattern using at least one hash function. The at least one hash function may take the identifier of a device as an input and output index positions indicating resources in the resource pool to be used for transmitting the feedback. The index positions may correspond to elements in a bloom filter. The bloom filter may be a counting bloom filter. The bloom filter may be a spectral bloom filter. A bloom filter is a probabilistic data structure, which allows for rapid determination of whether or not a particular item has been hashed and introduced into the set. The different resource elements in the resource pool (such as those shown in the vector 500 of FIG. 5) may represent elements in the bloom filter. By transmitting transmission feedback on resources selected based on at least one hash function for producing index values into a bloom filter, UE A is able to rapidly determine based on the active resources in the feedback it receives, which devices have transmitted feedback. To determine whether or not a particular device has transmitted feedback, UE A applies the same at least one hash function to the identifier of the particular device to output the index positions into the bloom filter/resource pool. UE A examines the activation pattern in the transmission feedback it receives to determine whether the resources at those determined index positions are active. If so, UE A determines that the device has transmitted feedback. If not, UE A determines that the device has not transmitted feedback.

An example of providing transmission feedback will now be given. In this example, UE 2 and UE 4 have successfully decoded data transmitted to the group by the transmitting device, whilst UE 1 and UE 3 have not successfully decoded the data. In the example, following the receipt of the data from the transmitting device (not shown), UE 1 attempts to decode the received data. Upon failing to successfully decode the received data, UE 1 transmits a NACK in resource elements 0 and 3. UE 3 also receives the data and attempts to decode the data. Upon failing to successfully decode the received data, UE 3 transmits a NACK in resource elements 0 and 1. UE 2 and UE 4 have successfully received the data and, therefore, do not transmit NACKs.

UE A first checks to determine whether or not the overall number of NACKs received from the devices of the group in response to the data it transmitted exceeds a threshold. If so, a group re-transmission may be performed without the need to identify the individual devices for which transmission has failed. If the number of NACKs does not exceed the threshold, the UE A determines the identities of the individual devices that failed to successfully decode the data. When the individual devices have been identified, specific action for those devices (e.g. a dedicated retransmission or an assignment to a sub-group) can be carried out.

As shown in FIG. 5, there is some overlap between the transmissions of the NACKs made by UE 1 and UE 3. The transmitting device receives the transmitted NACKs in resource elements 0, 1, and 3. By comparing this activation pattern to the resource patterns associated with the different devices (UE 1 to UE 4), the transmitting device is able to determine a match between the activation pattern and the transmission patterns for UE 1 and UE 3. In response to determining a match between the activation pattern and the transmission patterns for UE1 and UE 3, the transmitting device determines that UE 1 and UE 3 have transmitted NACKs. In response to this determination, the transmitting device may take an appropriate action, such as performing a dedicated retransmission of the data to UE 1 and UE 3, without retransmitting to UE 2 and UE 4.

Additionally or alternatively, in response to determining that UE 1 and UE 3 have transmitted NACKs, UE 1 and UE 3 may be allocated to a sub-group configured to receive further data transmissions made to the group with different parameters. The different parameters provide the data to the sub-group with greater reliability. These different parameters may, for example, provide higher transmission power for the subsequent data transmissions made on the PSSCH.

Figure 6:
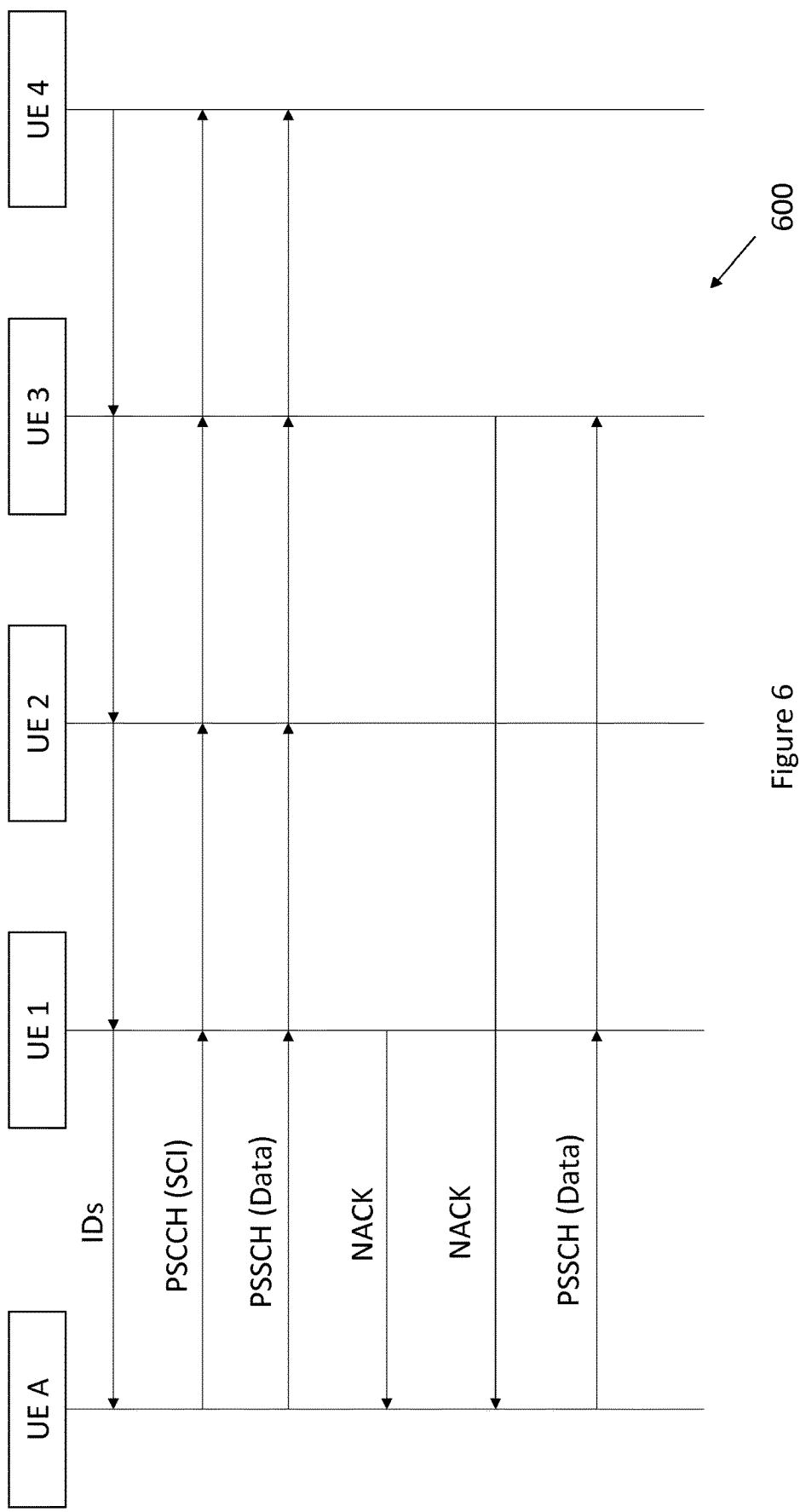
FIG. 6 shows an example of a message sequence diagram according to example embodiments of the application.

Reference is made to FIG. 6, which illustrates a message sequence diagram 600 illustrating the different messages exchanged between the devices in the example discussed above with respect to FIG. 5. The transmitting devices is labelled as UE A and the receiving devices are labelled as UE 1 to 4.

Each of the devices (UE 1 to 4) of the group is configured to transmit an identifier (ID) of itself to UE A. UE A receives the ID of each device and uses the ID to compute, within a resource pool, the resource pattern to be used for the associated transmission feedback by each device.

The UE A sends the control information (SCI) in the PSCCH to each device in the group. The control information comprises an indication of the common resource pool in which the transmission feedback is to be provided by the devices of the group to UE A. Each of the devices of the group receives this indication and uses it to determine the resources on which it will transmit any transmission feedback. To determine these resources, each of UE 1 to 4 uses the same algorithm, as applied by UE A, to determine its unique resource pattern for transmitting feedback to UE A. Therefore, since the same algorithm is applied, when the devices transmit their feedback, UE A is able to match the resources patterns it determined using the algorithm to the activation pattern it receives so as to identify the devices transmitting feedback.

After sending the control information, UE A sends the groupcast transmission of the data in the PSSCH to each device in the group. Each device in the group receives the data and attempts to decode that data. As explained above with respect to FIG. 5, in this example, UE 2 and UE 4 successfully decode the data received from UE A, whereas UE 1 and UE 3 do not successfully decode the received data. Therefore, UE 1 and UE 3 provide transmission feedback in the form of NACKs to UE A, whereas UE 2 and UE 4 do not provide transmission feedback. It is noted that in this example, the transmission feedback takes the form of NACKs only. However, in other examples, the transmission feedback may additionally or alternatively take the form of ACKs. In that case, UE 2 and UE 4 transmit ACKs to UE A in response to successfully decoding the data.

In the case in which both ACKs and NACKs are provided as feedback, the ACKs and NACKs may be transmitted orthogonally to each other to prevent interference between the two types (i.e. ACKs and NACKs) of feedback message.

The NACKs transmitted by UE 1 and UE 3 are sent in the determined resource patterns for UE 1 and UE 3. UE A receives these NACKs and determines that UE 1 and UE 3 sent the NACKs by matching the received activation pattern to the determined resource patterns for UE 1 and UE 3.

In response to determining that UE 1 and UE 3 failed to successfully decode the data, UE A performs a retransmission of the data to UE 1 and UE 3. This retransmission may be made specifically to UE 1 and UE 3 without transmitting the data to UE 2 and UE 4.

As noted, in some example embodiments, instead of performing a dedicated retransmission to only some of the devices of the group (i.e. UE 1 and UE 3), UE A performs a retransmission of the data to every device in the group. UE A determines to perform this transmission in response to detection of a threshold condition in the received transmission feedback. The threshold condition is met when a threshold number of devices did not successfully receive and decode the data. UE A may determine that the threshold condition is met when at least a predefined number of devices in the group have provided feedback indicating that they failed to successfully decode the data. Additionally or alternatively, the UE A may determine that the threshold condition is met when at least a predefined number of devices in the group were not available for receiving the data. In the case that feedback is expected from all devices in the group (i.e. both ACKs and NACKs are enabled) the unavailability of devices may be indicated by those devices not providing any feedback.

Therefore, two different criteria can be applied to determine whether to perform a group retransmission. The first criteria being that a number of active devices have failed to successfully decode the data. The second criteria being that a number of devices were not available for receiving data (e.g. due to DTX). If either or both of these conditions are met, a group retransmission is performed by UE A. If neither of these conditions are met, UE A takes the appropriate action (e.g. dedicated retransmission or assignment to a sub-group) for the individual devices for which it is identified that transmission failed.

Applying the first criteria, the threshold condition may be met if the number of NACKs received is above a predefined threshold. In this case, the UE A performs a retransmission of the data to each device (i.e. UE 1 to 4) in the group. If the number of NACKs received is below this threshold, the UE A may perform a dedicated retransmission only to the devices which sent the NACKs. The first criteria may similarly be applied when the transmission feedback comprises ACKs. In that case, if the number of ACKs received is below a predefined threshold, the UE A performs a retransmission of the data to each device (i.e. UE 1 to 4) in the group. If the number of ACKs received is above this threshold, the UE A may perform a dedicated retransmission only to the devices which did not send ACKs. UE A may determine whether the number of devices transmitting ACKs or NACKs meets a threshold by comparing the number of active resources in the resource pool to a threshold.

Applying the second criteria, the threshold condition may be met if the number of devices in the group that are not presently available for receiving data is above a threshold. These devices may be unavailable for receiving data in the case that they are operating with discontinuous transmissions (DTX), e.g. because they are operating in power saving mode, are inactive, etc. If the feedback mode is such that each device in the group, after receiving the data transmission, is expected to send either an ACK or a NACK, UE A is able to determine the number of devices which were unavailable by determining the number of devices which did not transmit an ACK or a NACK. UE A may determine whether the number of devices not transmitting ACKs and NACKs meets a threshold by comparing the number of active resources in the resource pool to a threshold. If the number of such devices not transmitting ACKs and NACKs is above a threshold, UE A performs a group retransmission. If the number of such devices not transmitting ACKs and NACKs is below a threshold, UE A may perform a dedicated retransmission only to those device that provided a NACK and those devices that did not provide any feedback, without retransmitting the data to the devices that provided ACKs.

Figure 7:
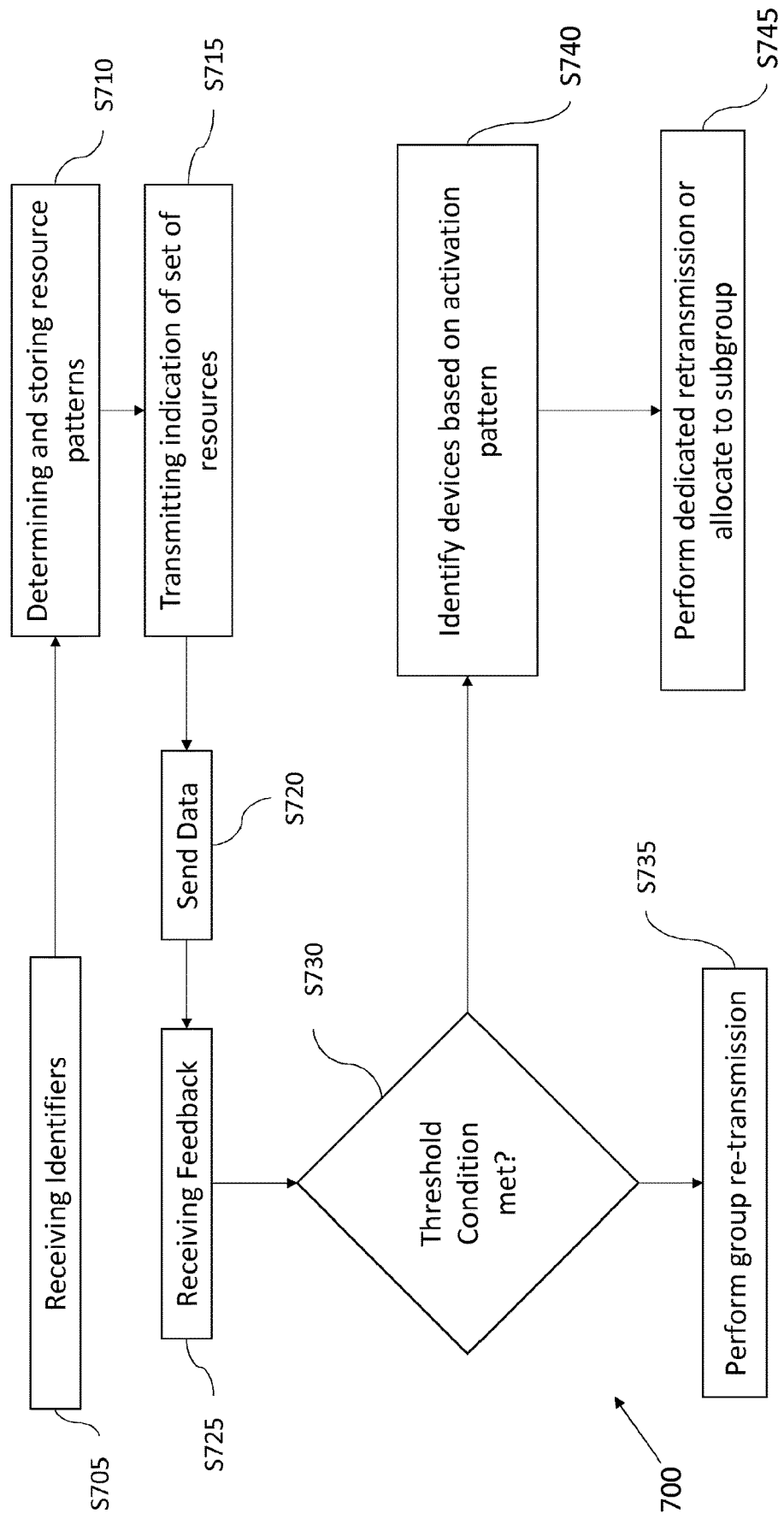
FIG. 7 illustrates a method performed in a transmitting apparatus according to example embodiments of the application.

Reference is made to FIG. 7, which illustrates a method 700 performed in a transmitting apparatus according to example embodiments of the application.

At S705, the transmitting apparatus is configured to receive identifiers of the devices of the group which it is configured to transmit data to in the upcoming groupcast transmission.

At S710, the transmitting apparatus is configured to, for each receiving device of the group, determine and store resource patterns determined on the basis of the received identifiers. These resources patterns are computed using an algorithm taking the identifiers are inputs. Each resource pattern may be determined by applying at least one hash function to the respective device identifier to determine index positions in a bloom filter. These index positions indicate the resources in the resource pool on which the transmission of feedback is to be carried out. The index positions therefore represent the resource pattern.

At S715, the transmitting apparatus sends an indication of the resource pool in which transmission feedback is to be provided. This indication is sent to each device in the group.

At S720, the transmitting apparatus is configured to transmit the data in a device to device groupcast communication to each of the devices in the group.

At S725, the transmitting apparatus receives transmission feedback from a plurality of devices of the group.

At S730, the transmitting apparatus determines whether or not the feedback received indicates that the number of failed transmission is above a threshold. This may be determined by determining that the number of received NACKs is above a threshold. Additionally or alternatively, it may be determined by determining the number of devices in the group that were not operating so as to receive the transmission of data at S720. This may be a result of discontinuous transmission in the operation of devices of the group. The transmitting device is configured to—if the receiving devices are configured to provide both ACKs and NACKs in their feedback—determine the number of receiving devices that are were available to receive data by determining the number of devices that did not provide either an ACK or NACK in the transmission feedback received at S725

If the transmitting apparatus determines that the number of failed transmissions is above a threshold (due to the number of NACKs received and/or the number of devices from which no feedback was received), the method 700 proceeds to S735. On the other hand, if the transmitting apparatus determines that the threshold condition is not met, the method 700 proceeds to S740.

At S735, the transmitting device is configured to perform a retransmission to every device in the group.

At S740, the transmitting device is configured to identify the devices for which data was not successfully received (i.e.

which did not successfully decode the data). This is achieved by matching the activation pattern in the received transmission feedback to the determined resource patterns that were determined in S710. The matching enables the transmitting device to determine which devices have sent NACKs/ACKs and therefore which devices have not successfully received the data.

At S745, the transmitting device performs at least one action for the devices identified in S740. The transmitting device may perform a dedicated retransmission only to those devices which did not successfully receive the data in the transmission in S720, without transmitting to the other devices in the group. Additionally or alternatively, the transmitting device may allocate the devices identified in S740 to a subgroup having different transmission parameters which provide improved transmission reliability.

Figure 8:
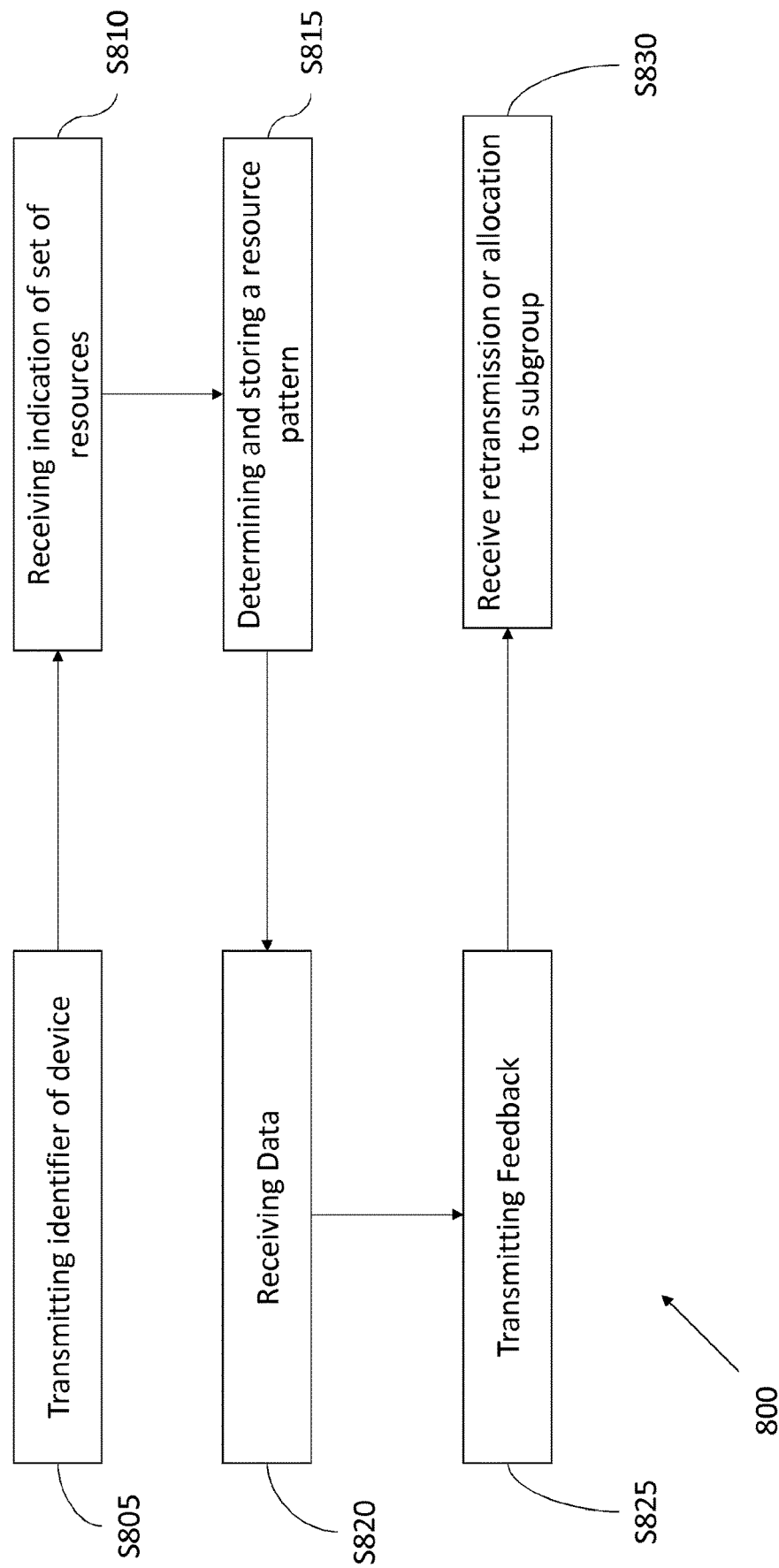
FIG. 8 illustrates a method performed in a receiving apparatus according to example embodiments of the application.

Reference is made to FIG. 8, which illustrates a method 800 performed in a receiving device of a group according to example embodiments of the application.

At S805, the receiving device transmits an identifier of itself to the transmitting device.

At S810, the receiving device receives an indication of the resource pool in which transmission feedback is to be provided for the upcoming data transmission.

At S815, the receiving device determines and stores a resource pattern in the resource pool. The resource pattern is determined in dependence upon the identifier of the device, e.g. by applying at least one hash function to output index positions in the resource pool according to a bloom filter.

At S820, the receiving device is configured to receive data from the transmitting device in message that is sent to a group of devices which the receiving device belongs to.

At S825, the receiving device transmits its transmission feedback to the transmitting device.

At S830, the receiving device receives from the transmitting device a re-transmitted copy of the data and/or an indication that the receiving device is allocated to a subgroup having transmission parameters for improved reliability of communication. The re-transmitted copy of the data may be a dedicated re-transmission sent to the receiving device and, potentially, one or more other devices of the group for which transmission of the data failed. Alternatively, the re-transmitted copy of the data may be a group retransmission sent to every device in the group. The dedicated re-transmission is performed only if the transmission failed and, therefore, the transmission feedback sent in S825 comprises a NACK. Similarly, the allocation to the subgroup is performed only if the transmission failed and, therefore, the transmission feedback sent in S825 comprises a NACK. However, since it depends upon a threshold condition of the common resource pool, a group retransmission may be carried in the case that the transmission feedback in S825 comprises an ACK or a NACK.

It should be understood that each block of the flowcharts of FIGS. 7 and 8 and any combination thereof may be implemented by various means or their combinations, such as hardware, software, firmware, one or more processors and/or circuitry.

The methods may be implemented on a mobile device as described with respect to FIG. 2 or control apparatus as shown in FIG. 3.

Control functions may comprise storing a resource pattern in a set of transmission resources, wherein said resource pattern is associated with a further device; causing a transmission of data to a group of devices; and receiving transmission feedback from each of a plurality of devices of the group, said plurality of devices comprising the further device, wherein the received transmission feedback comprises an activation pattern that matches the stored resource pattern associated with the further device, wherein the transmission feedback received from the further device comprises at least some overlap in transmission resources with transmission feedback received from other devices of said plurality of devices.

Additionally or alternatively, control functions may comprise: storing a resource pattern in a set of transmission resources, wherein said resource pattern is associated with an apparatus; receiving a transmission of data from a further apparatus, said transmission made to a group of devices comprising the apparatus; and sending transmission feedback to the further apparatus in a resource pattern matching the stored resource pattern, wherein the stored resource pattern has at least some overlap in transmission resources with transmission feedback sent from other devices of the group of devices.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst example embodiments have been described in relation to LTE/LTE-A/New Radio/Sidelink, the invention is not limited to these standard. Furthermore, although example embodiments have been described in terms of user equipment engaging in D2D communications, the invention is not so limited. Similar principles can be applied in relation to other networks and communication systems. Therefore, although certain example embodiments were described above by way of example with reference to certain example architectures for wireless networks, technologies and standards, example embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various example embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The example embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Figure 9:
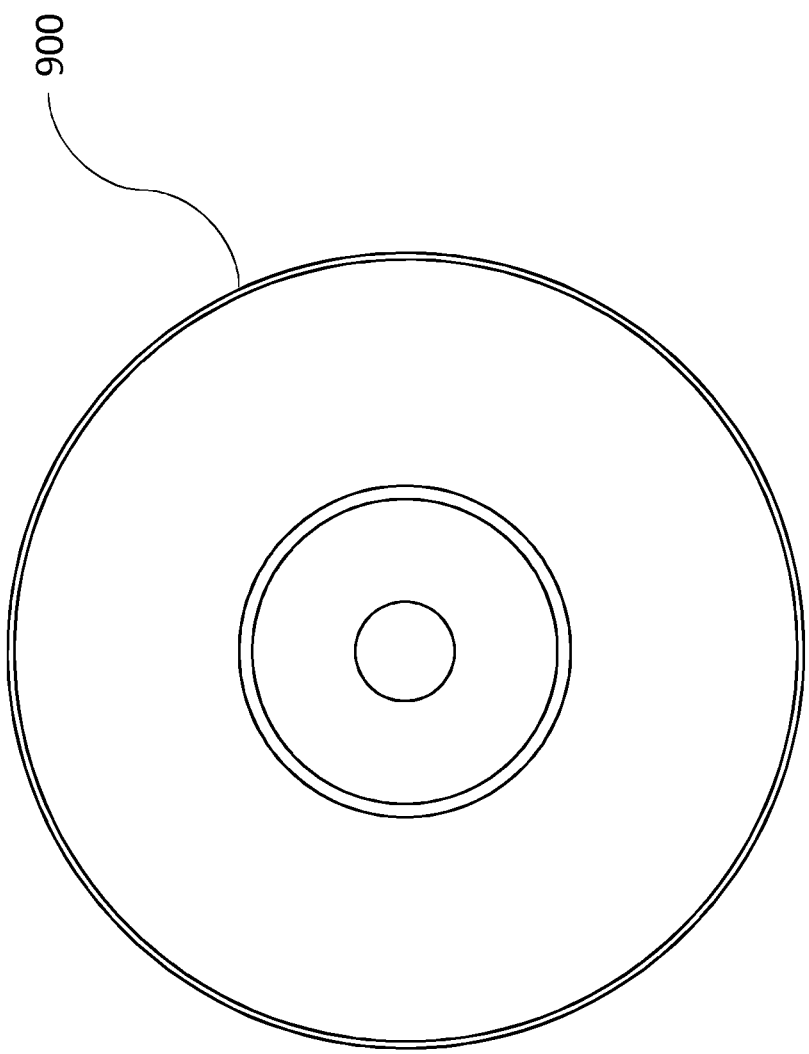
FIG. 9 illustrates an example of a non-transitory computer readable medium.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. An example of a non-transitory computer readable medium 900 is shown in FIG. 9. The non-transitory computer readable medium 900 may be a CD or DVD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Example embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims. Indeed there is a further embodiment comprising a combination of one or more example embodiments with any of the other example embodiments previously discussed.

The invention claimed is:

1. An apparatus comprising:
   at least one processor; and
   at least one memory storing instructions, that when executed by the at least one processor, cause the apparatus at least to:
   determine a resource pattern in a set of transmission resources,
   wherein said resource pattern is associated with a further apparatus of a group of apparatus;
   transmit data to the group of apparatus; and
   receive transmission feedback from each of the group of apparatus, said group of apparatus comprising the further apparatus; and
   determine the resource pattern in the set of transmission resources in dependence upon an identifier of the further apparatus,
   wherein the received transmission feedback comprises an activation pattern that matches the resource pattern that is determined associated with the further apparatus,
   wherein the transmission feedback received from the further apparatus comprises
   overlap in transmission resources with the transmission feedback received from other apparatus of said plurality group of apparatus;
   receive the identifier of the further apparatus;
   wherein the resource pattern is determined in the indicated set of resources with application of at least one hash function to the identifier to output index positions into the set of transmission resources, and
   wherein the transmission feedback comprises at least one of: acknowledgments or
   negative acknowledgements.

2. The apparatus as claimed in claim 1, wherein the at least one memory is storing instructions, that when executed by the at least one processor, cause the apparatus at least to:
   identify in the received transmission feedback, transmission feedback
   from the further apparatus in response to identifying the activation pattern in the received transmission feedback that matches the resource pattern that is determined; and
   in response to identifying the transmission feedback from the further apparatus,
   cause a retransmission of the data to the further apparatus.

3. The apparatus as claimed in claim 1, wherein the at least one memory is storing instructions, that when executed by the at least one processor, cause the apparatus at least to:
   identify in the received transmission feedback, transmission feedback
   from the further apparatus in response to identifying the activation pattern in the received transmission feedback that matches the resource pattern that is determined;
   in response to identifying the transmission feedback from the further apparatus, allocate the further apparatus to a sub-group of the group of apparatus; and
   transmit further data to the further apparatus using transmission parameters associated with the sub-group,
   wherein the transmission parameters associated with the sub-group are different to
   transmission parameters used for the transmission of the data to the at least one device.

4. An The apparatus as claimed in claim 1, wherein the at least one memory is storing instructions, that when executed by the at least one processor, cause the apparatus at least to:
   in response to determining based on the received transmission feedback that a number of failed transmissions for the group exceeds a threshold, cause a retransmission of the data to each of the group of apparatus.

5. The apparatus as claimed in claim 1, wherein the at least one memory is storing instructions, that when executed by the at least one processor, cause the apparatus at least to:
   for each of the group of apparatus:
   determine a resource pattern in the set of transmission resources, wherein the resource pattern is associated with a respective apparatus; and
   identify, in the received transmission feedback, transmission feedback from the respective apparatus in response to identifying an activation pattern in the received transmission feedback that matches the resource pattern that is determined and for the respective apparatus.

6. The apparatus as claimed in claim 1, wherein the at least one memory is storing instructions, that when executed by the at least one processor, cause the apparatus at least to:

in response to determining based on the transmission feedback that a number of failed transmissions for the group does not exceed a threshold, causing cause a dedicated retransmission of the data to each apparatus of the group for which a failure to successfully decode the data is indicated in the received transmission feedback without retransmitting to every apparatus in the group.

7. An apparatus comprising:
at least one processor; and
at least one memory storing instructions, that when executed by the at least one processor, cause the apparatus at least to:
determine a resource pattern in a set of transmission resources, wherein said resource pattern is associated with the apparatus;
receive a transmission of data, said transmission made to said group of apparatus comprising the apparatus; and
send transmission feedback to the further apparatus in a resource pattern matching the resource pattern that is determined; and
determine the resource pattern in the set of resources in dependence upon an identifier of the further apparatus,
wherein the transmission feedback has overlap in transmission resources with transmission feedback sent from other apparatus of the group of apparatus;
transmit the identifier of the further apparatus to the further apparatus;
determine the resource pattern in the indicated set of resources with applying at least one hash function to the identifier to output index positions into the set of transmission resources, and
wherein the transmission feedback comprises at least one of: acknowledgments or negative acknowledgements.

8. The apparatus as claimed in claim 7, the apparatus wherein the at least one memory is storing instructions, that when executed by the at least one processor, cause the apparatus at least to:
follow the transmission of the transmission feedback to the further apparatus, and
receive a retransmission comprising the data from the further apparatus.

9. The apparatus as claimed in claim 8, wherein the retransmission comprises at least one of:
a transmission sent to every apparatus in the group; or
a dedicated retransmission not sent to every apparatus in the group.

10. The apparatus as claimed in claim 9, wherein based on the transmission feedback comprising an acknowledgment, the retransmission comprises the transmission sent to every apparatus in the group.

11. The apparatus as claimed in claim 7, wherein the at least one memory is storing instructions, that when executed by the at least one processor, cause the apparatus at least to:
receive an indication of the set of transmission resources from the further apparatus.

12. The apparatus as claimed in claim 7, wherein the transmission feedback comprises a negative acknowledgment, wherein the at least one memory is storing instructions, that when executed by the at least one processor, cause the apparatus at least to:
follow the transmission of the negative acknowledgment to the further apparatus:
receive an indication that the apparatus is allocated to a sub-group of the group of apparatus; and
subsequently, receive further data from the further apparatus using transmission parameters associated with the sub-group,
wherein the transmission parameters associated with the sub-group are different to transmission parameters used for transmission of the data from the further apparatus.

13. A method comprising:
determining a resource pattern in a set of transmission resources, wherein said resource pattern is associated with a further apparatus;
causing a transmission of data to the group of devices; and
receiving transmission feedback from each of the group of apparatus, said
plurality of devices comprising the further apparatus; and
determining the resource pattern in the set of transmission resources in dependence upon an identifier of the further apparatus,
wherein the received transmission feedback comprises an activation pattern that matches the resource pattern that is determined and associated with the at least one device,
wherein the transmission feedback received from the further apparatus comprises an overlap in transmission resources with the transmission feedback received from other apparatus of said group of apparatus;
receiving the identifier of the further apparatus;
wherein the resource pattern is determined in the indicated set of resources with application of at least one hash function to the identifier to output index positions into the set of transmission resources, and
wherein the transmission feedback comprises at least one of: acknowledgments or negative acknowledgements.

14. A method comprising:
determining a resource pattern in a set of transmission resources, wherein said resource pattern is associated with an apparatus of a group of apparatus;
receiving a transmission of data from a further apparatus, said transmission made to the group of apparatus comprising the apparatus; and
sending transmission feedback to the further apparatus in a resource pattern matching the resource pattern that is determined,
determining the resource pattern in the set of resources in dependence upon an identifier of the further apparatus,
wherein the transmission feedback has overlap in transmission resources with transmission feedback sent from other apparatus of the group of apparatus;
transmitting the identifier of the further apparatus to the further apparatus;
determining the resource pattern in the indicated set of resources with applying at least one hash function to the identifier to output index positions into the set of transmission resources, and
wherein the transmission feedback comprises at least one of: acknowledgments or negative acknowledgements.

15. A non-transitory program storage device readable by a machine, tangibly embodying a program of instructions executable by the machine for performing operations, the operations comprising:
determining a resource pattern in a set of transmission resources, wherein said resource pattern is associated with a further apparatus;
causing a transmission of data to the group of apparatus; and
receiving transmission feedback from each of a the group of apparatus, said group of apparatus comprising the further apparatus; and determining the resource pattern in the set of transmission resources in dependence upon an identifier of the further apparatus,
wherein the received transmission feedback comprises an activation pattern that matches the resource pattern that is determined and associated with the further apparatus,
wherein the transmission feedback received from the further apparatus comprises an overlap in transmission resources with the transmission feedback received from other apparatus of said group of apparatus;
receiving the identifier of the further apparatus;
wherein the resource pattern is determined in the indicated set of resources with application of at least one hash function to the identifier to output index positions into the set of transmission resources, and
wherein the transmission feedback comprises at least one of: acknowledgments or negative acknowledgements.

16. A non-transitory program storage device readable by a machine, tangibly embodying a program of instructions executable by the machine for performing operations, the operations comprising:

determining a resource pattern in a set of transmission resources, wherein said resource pattern is associated with an apparatus;
receiving a transmission of data from the apparatus, said transmission made to a group of apparatus comprising the apparatus; and
sending transmission feedback to the further apparatus in a resource pattern matching the resource pattern that is determined,
determining the resource pattern in the set of resources in dependence upon an identifier of the further apparatus,
wherein the transmission feedback has overlap in transmission resources with transmission feedback sent from other apparatus of the group of apparatus;
receiving the identifier of the further apparatus;
wherein the resource pattern is determined in the indicated set of resources with application of at least one hash function to the identifier to output index positions into the set of transmission resources, and
wherein the transmission feedback comprises at least one of: acknowledgments or negative acknowledgements.

\* \* \* \* \*